United States Patent [19]

Wensman et al.

[11] Patent Number: 4,492,182
[45] Date of Patent: Jan. 8, 1985

[54] METHOD AND DEVICE FOR FEEDING ANIMALS

[76] Inventors: Gunnar Wensman; Britta Wensman, both of Myrmalmsvägen 56, 802 38 Gävle, Sweden

[21] Appl. No.: 464,512
[22] PCT Filed: Jun. 11, 1982
[86] PCT No.: PCT/SE82/00207
§ 371 Date: Jan. 27, 1983
§ 102(e) Date: Jan. 27, 1983
[87] PCT Pub. No.: WO82/04379
PCT Pub. Date: Dec. 23, 1982

[30] Foreign Application Priority Data

Jun. 12, 1981 [SE] Sweden ............................... 8103690

[51] Int. Cl.³ .............................................. A01K 61/02
[52] U.S. Cl. ...................................... 119/51 R; 119/3
[58] Field of Search ................................. 119/51 R, 3

[56] References Cited

U.S. PATENT DOCUMENTS

3,526,210 9/1970 Burton ............................ 119/51 R
3,528,588 9/1970 Moore ......................... 119/51 R X

*Primary Examiner*—Hugh R. Chamblee
*Attorney, Agent, or Firm*—Hauke and Patalidis

[57] ABSTRACT

A method and device for feeding animals, particularly fish, comprise supply of food into a conduit (3) by a food supply member (2). The food is transported in the conduit to feed locations (5) by a fluid flow. The food supply member comprises a rotor having cells adapted to be successively filled and brought into communication with the conduit (3) to be successively evacuated by the flow of fluid maintained in the conduit on rotation of the rotor.

14 Claims, 13 Drawing Figures

METHOD AND DEVICE FOR FEEDING ANIMALS

BACKGROUND OF THE INVENTION

Field of Invention and Prior Art

This invention is related to a method and device for feeding animals in accordance with that defined in the preambles of appended claims 1 and 3 respectively.

This prior art is disclosed in e.g. the Swedish patent specification No. 309 338. However, the food supply member thereof is formed by a tube portion protruding into the conduit, said tube portion allowing introduction of food into the conduit when no airflow occurs therein. The food volume remains in the conduit until feeding is required, at which time a valve is opened and an air flow admitted into the conduit so that the food volume is moved forwardly in the short conduit and distributed over an adjacent fish basin. Due to the periodic distribution of food in the conduit, the length thereof must be very limited since it may otherwise be clogged. Thus, when several feed locations are present, it is necessary to provide a separate food container in connection with each feed location, which is costly and considerably increases the work required for handling the food. Another disadvantage is that the dosage of food into the conduit probably will be less accurate. This particularly applies if the food has a large grain size or tendency to agglomerate. The technique according to the Swedish patent may in such cases be difficult to use. For wet food it is surely inadequate.

Summary of the Invention

The object of the present invention is to reduce the disadvantages discussed above associated with the prior art.

This object is obtained by the features defined in the characterizing portions of claims 1 and 3 respectively. By such a successive introduction of food into the transport conduit while maintaining an air flow therein, the risk for clogging of the conduit is minimized and at the same time a very good accuracy regarding food dosage may be obtained. The continuous introduction of food into the fluid flow enables food transport from a central food store to feed locations situated at great distance from the store. Reliable and constant operation is furthermore obtained in that the fluid flow in the conduit is actively used for evacuating the cells. This is particularly important with sticky or wet food.

BRIEF DESCRIPTION OF THE DRAWINGS

With reference to the appended drawings, a specific disclosure of an example of an embodiment of the invention will follow hereinafter.

In the drawings:

FIG. 11 is a diagrammatic partially sectional view illustrating an alternative embodiment;

DETAILED DISCLOSURE OF PREFERRED EMBODIMENTS

Figure 1:
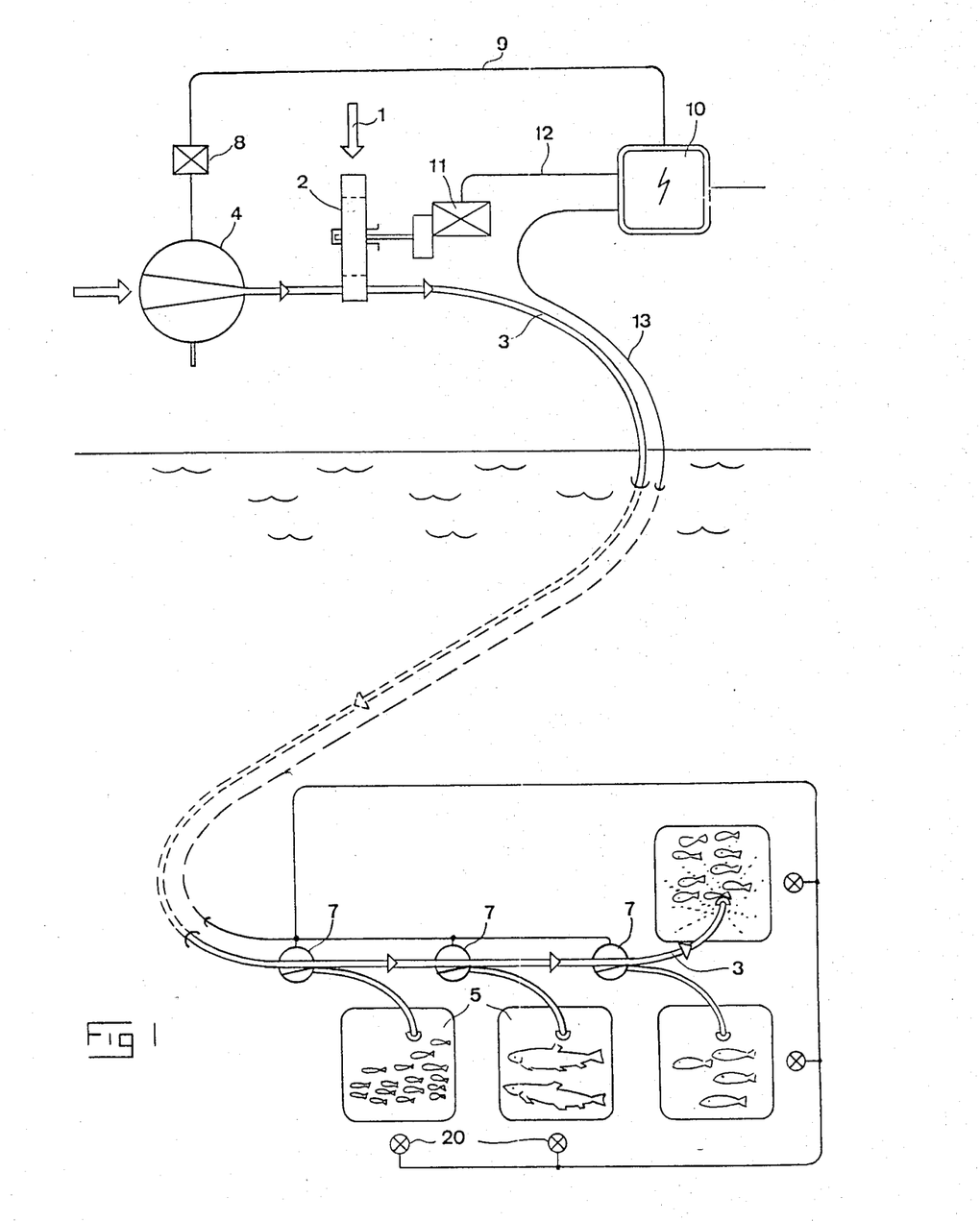
FIG. 1 is a diagrammatic view illustrating the device according to the invention.

The device in FIG. 1 includes a central food store or food container 1, from which a food supply member 2 is adapted to supply food into a conduit 3. A pump 4 is arranged to cause fluid to flow through conduit 3 to a number of feed locations 5 and carry along the food on passage through supply member 2.

The feed locations 5 are constituted by four net bags for fish. These net bags are located in lakes or water courses spaced from the shore. However, it is preferred that components 1, 2 and 4 are located on the shore while conduit 3 possibly constructed as a flexible hose partially may run on the bottom of the lake or water course and, ashore, be digged into the ground. Along conduit 3, path selectors 7 are provided for diverting fluid/food flowing in the conduit to net bags associated to the path selectors, which are so designed that they in one position allow transport to a net bag at the end of conduit 3.

The drive motor 8 for pump 4 is by a line 9 connected to a control unit 10, which also controls a drive motor 11 for supply member 2 via a line 12 and the path selectors via a cable 13. Control unit 10 is programmable so as to obtain desired feed conditions. For optimal fish growth, it is essential that feeding is carried out at a proper time and with food volumes adjusted in dependence upon other parameters, water temperature, fish size and number.

Figure 2:
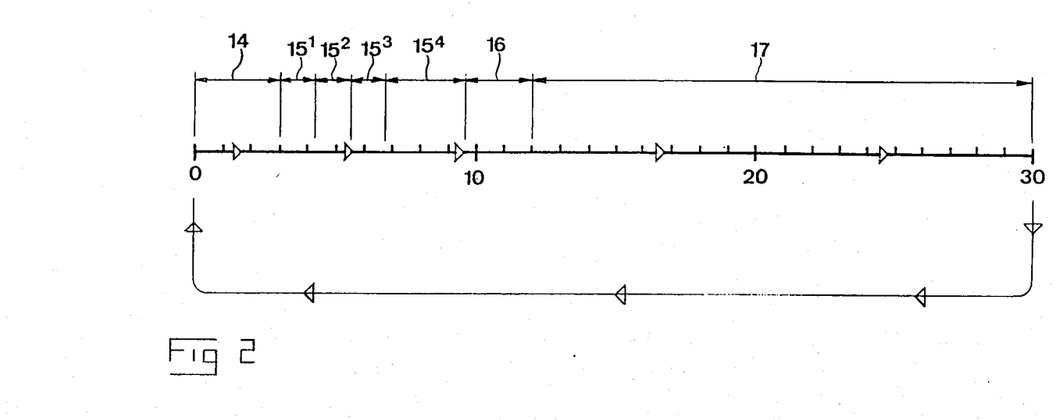
FIGS. 2 and 3 are graphs illustrating the feeding.
Figure 2:
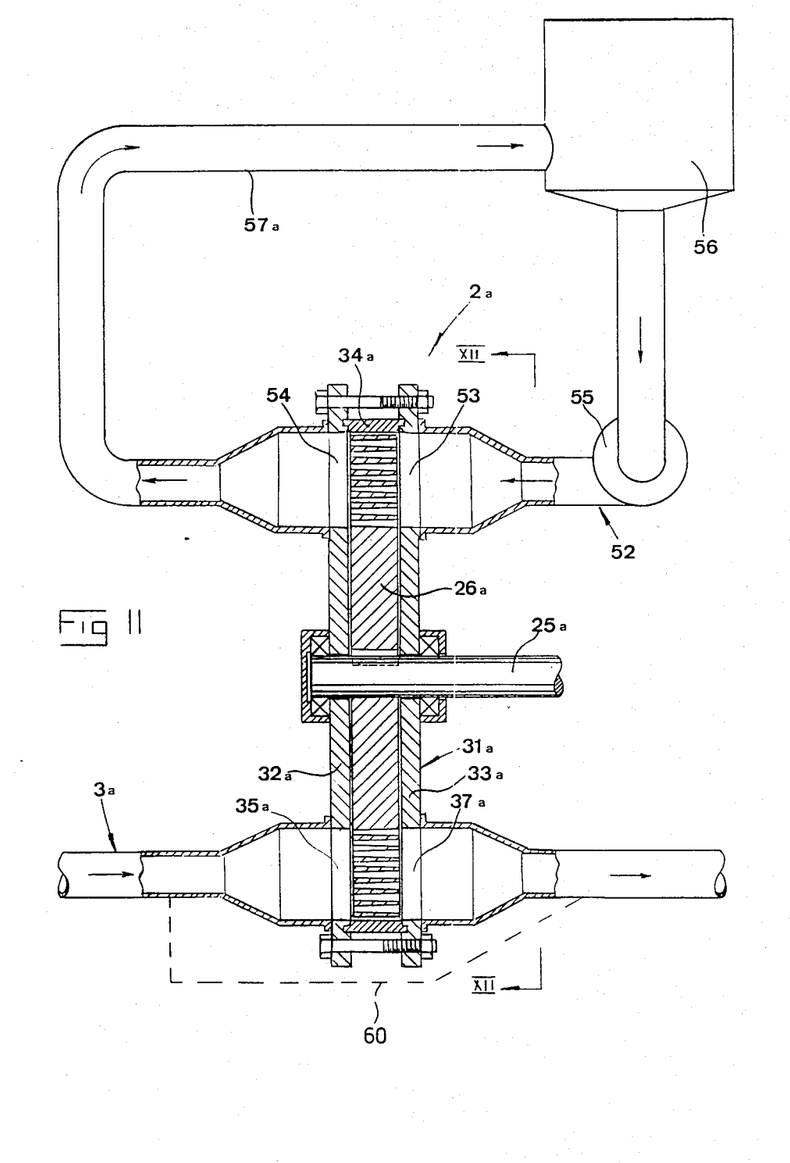

Dry food, wet food and food with humidity lying there-between occur. An embodiment will now be disclosed with reference to FIGS. 2–10 which is particularly well suited for relatively dry, particularly pelletized food. FIG. 2 illustrates an example of a feed cycle for such relatively dry food, for which a transport fluid constituted by air is used i.e. the pump 4 is an air fan.

Since conduit 3 runs to bags 5 under water, condensate may be formed in the conduit and may in combination with the food clog the conduit. To avoid this, control unit 10 is adapted to cause fan 4 to blow air through the conduit during a cleaning period 14 without operating supply member 2. Thereafter, cleaning control unit 10 puts supply member 2 into operation to introduce food into the conduit. While maintaining continuous air flow in conduit 3 and introduction of food thereto, the air/food mixture may without interruption be distributed to the various fish bags during the periods $15^1$–$15^4$ by adjusting the selectors 7. The length of the periods may be programmed in dependance upon the feed variables discussed above. After supply of food to all bags, control unit 10 is adapted to stop operation of supply member 2 and cause fan 4 to operate during an additional period 16 so that a final cleaning of the conduit occurs. A varying pause 17 occurs within each feed cycle which e.g. may comprise 30 minutes.

Figure 3:
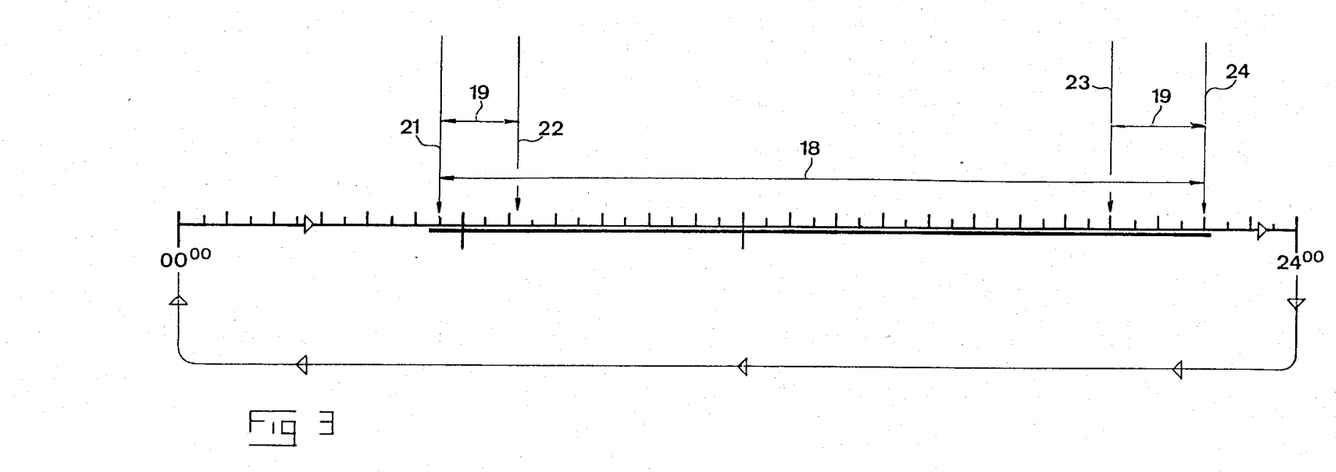
Figure 4:
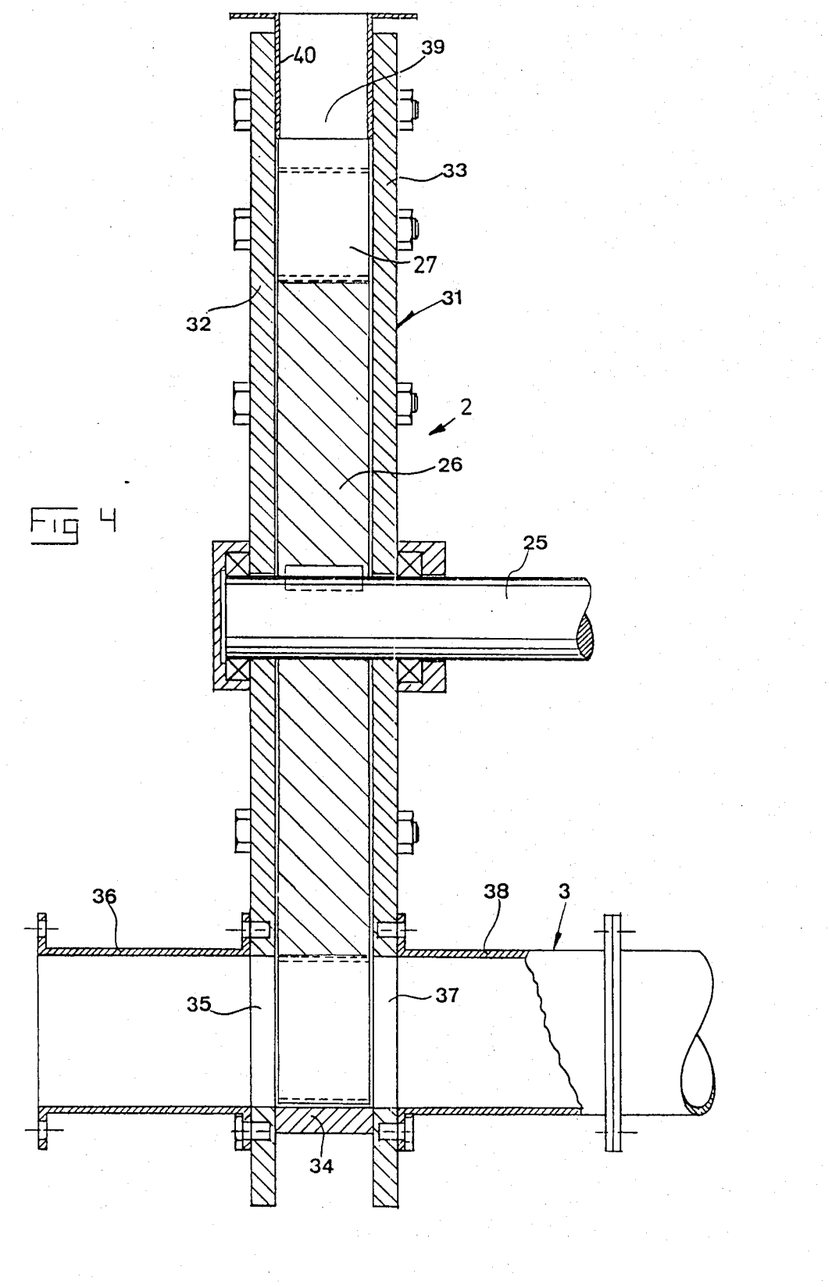
FIG. 4 is a partially sectional view illustrating a rotor and a housing therefor included in the device.
Figure 5:
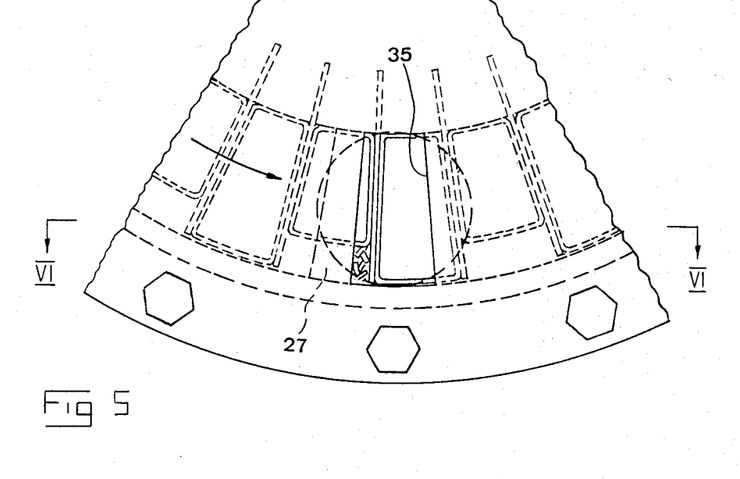
FIG. 5 is a view from the left of FIG. 4 and illustrating the lower portion of the housing.
Figure 6:
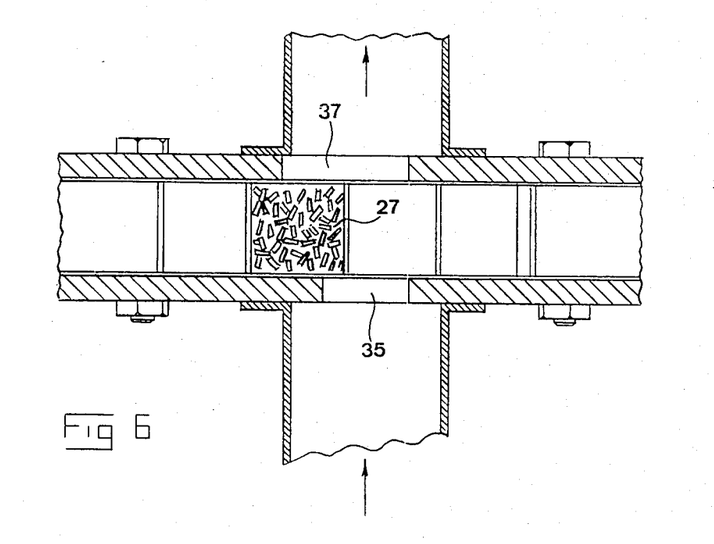
FIG. 6 is a view along line VI—VI in FIG. 5.

FIG. 3 exemplifies a feed program for 24 hours. The feed time 18 comprises a large number of feed cycles. The feed time per day may be extended by periods 19 by arranging lamps 20 at bags 5, FIG. 1. These lamps are operated by timers and photo cells to put on the lamps at a time 21 by the timer and put the same off at a time 22 when sufficient natural light is present. In a similar way, the lamps are put on at a time 23 when it has darkened and the program is terminated at time 24 by control from the timer.

Within each feed period 15¹–15⁴ in FIG. 2, the operation of supply member 2 may be periodically stopped so that the fish may recover between periods of food supply. To avoid problems with clogging of the conduit, it is preferred not to interrupt operation of fan 4.

To avoid clogging of conduit 3, control unit 10 is designed so that supply member 2 cannot be put into operation unless fan 4 is operating.

Figure 7:
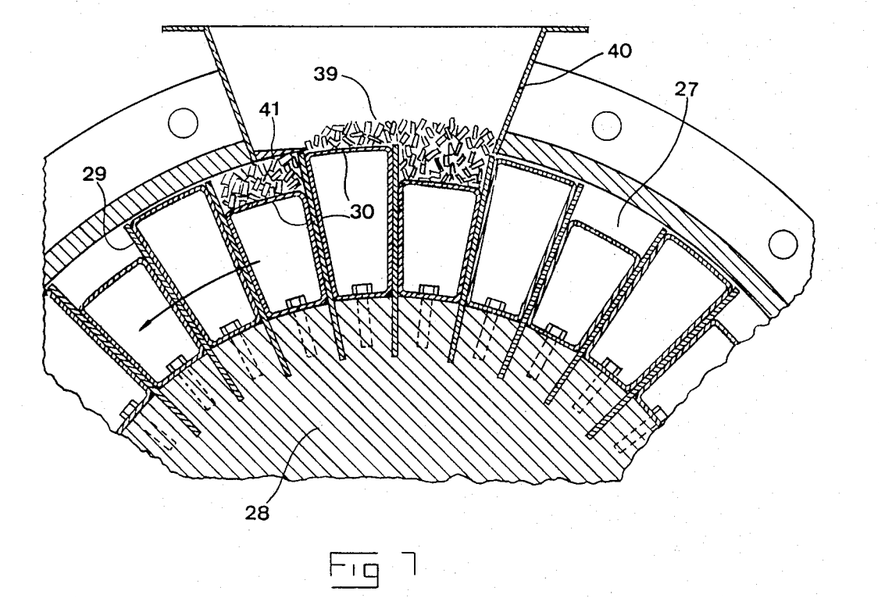
FIG. 7 is a sectional view in larger scale illustrating the rotor and its housing adjacent to a fill opening.
Figure 8:
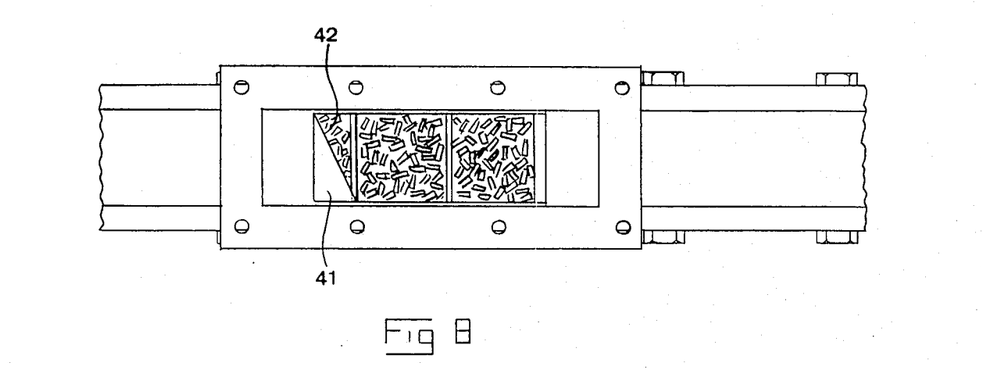
FIG. 8 is a top plan view of FIG. 7.

The supply member 2 (FIGS. 4–8) comprises a rotor 26, which is rotatable with a shaft 25 and comprises a number of cells 27 for food. The rotor 26 has an inner core like portion 28 with a circular periphery and from this portion, a number of walls 29 (FIG. 7) projects radially. The walls define the cells 27 from each other in a tangential direction. The cells 27 are open in the axial direction of the rotor and radially outwardly. The volume of the cells may be varied by mounting inserts 30 into the cells. These inserts are mounted against the radially innermost bottoms of the cells so that the radially outermost portions of the inserts thereafter serve as effective cell bottoms. It is to be observed that inserts 30 are axially open. FIG. 7 illustrates that every second insert 30 may have such dimensions that the corresponding cells are completely prevented from receiving food.

Rotor 26 has a generally cylindrical design and the axial extent of core portion 28 is generally equal to the corresponding extent of the partitions 29 and inserts 30. The rotor is located in a housing 31 with side walls 32 and 33 and a mantel 34 interconnecting the same. In the side wall 32 of housing 31, an inlet opening 35 is provided, which communicates with a pipe socket 36 included in conduit 3. Opposite inlet opening 35 in the other side wall 33 of the housing, an outlet opening 37 is provided which communicates with a pipe socket 38 attached to the housing and also included in conduit 3. The inlet and outlet openings 35, 37 are located in front of cells 27 in the rotor.

On the housing side opposite openings 35 and 37, a fill opening 39 is provided in the mantle 34 of the housing and connected to a funnel like pipe socket 40 communicating with a food container (not illustrated). The axis 25 of rotation of the rotor is preferably horizontal and opening 39 is located at the top while openings 35 and 37 are located at the bottom.

In connection with fill opening 39 a knife 41 is provided. As appears from FIG. 7, this knife is located so that its edge meets the cells after filling and immediately radially outwardly of the periphery of the rotor. Thus, knife 41 will cut food pellets located in the cutting zone while avoiding crushing and compacting of food. It is preferable to arrange the edge 42 of the knife inclined relative to the rotor axis as appears by FIG. 8.

The outlet opening 37 of the housing is so located and dimensioned relative to inlet opening 35 (see FIG. 6) that a cell 27 approaching the openings enters into communication with outlet opening 37 before entering into communication with inlet opening 35. This ensures that a cell, which when the rotor stops after terminated feeding communicates with inlet opening 35, through a portion thereof, will be evacuated of food through a comparatively larger outlet opening so that no excessive food crushing will occur. The inserts 30 may be mounted and dismounted through fill opening 39.

The supply capacity of the rotor may also be changed by varying its rotational speed. Another alternative is to replace the rotor with another rotor having a greater extent in axial direction.

It is to be observed that inlet and outlet openings 35, 37 have such dimensions compared to the wall thicknesses of partitions 29 and inserts 30 that inlet opening 35 continuously will communicate with outlet opening 37 by one or more cells 27 and through inserts 30 possibly arranged in the cells. This continuous air communication through the rotor reduces considerably the risk for clogging of conduit 3.

Figure 9:
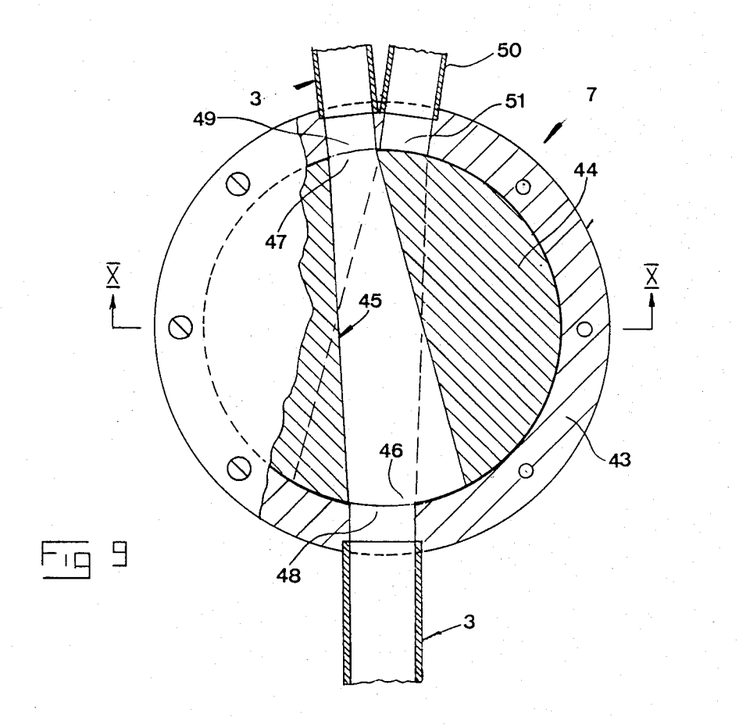
FIG. 9 is a view of a plan path selector.
Figure 10:
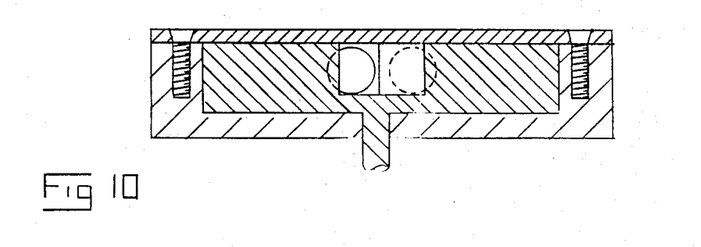
FIG. 10 is a section along line X—X in FIG. 9.

The path selector 7 illustrated in FIGS. 9 and 10 includes a diverting member 44 which is rotatably supported in a base 43 and has a tapering passage 45 with a wider end 46 and a narrower end 47. The passage extends transversely to the axis of rotation of member 44, said axis being perpendicular to the plane of the drawing (FIG. 9). The upstream end of conduit 3 connected to the selector 7 is denoted 48 while the downstream end thereof is denoted 49. A branch conduit 50 leading to the feed location associated to the selector has an entrance denoted 51. Ends 49 and 51 are located adjacent to each other.

The disk shaped member 44 is rotatable to and fro between the positions corresponding to the alternative positions for passage 45 indicated with full and dashed lines in FIG. 9. The wider end 46 of the passage communicated in both positions with upstream end 48 of conduit 3. The narrower end 47 of the passage has, however, a cross section corresponding to only one of ends 49 and 51 so that the air/food stream may be directed into the conduit end 49 or the branch end 51 by corresponding rotation of member 44.

The device described operates as follows: upon start of the feed cycle, fan 4 is initially operated to carry out cleaning before rotor 26 is put into operation. During rotation of the rotor, food will by gravity fall into the radially outwardly open cells and the food is transported away towards openings 35 and 37. As the filled cells reach inlet opening 35, the cells will be exposed to the air flow generated by the fan and it will force the food out of the cells and transport the food along in conduit 3. By continuously maintaining the air flow in the conduit and successively bringing the cells of the rotor in communication therewith, an even continuous food transport with generally constant food concentration in the conduit will be obtained. While transporting food in the conduit, path selectors 7 are controlled by control unit 10 so that the programmed distribution of food to the various bags is obtained. For the rest, the device operates in the manner already disclosed in connection with FIGS. 2 and 3.

Figure 12:
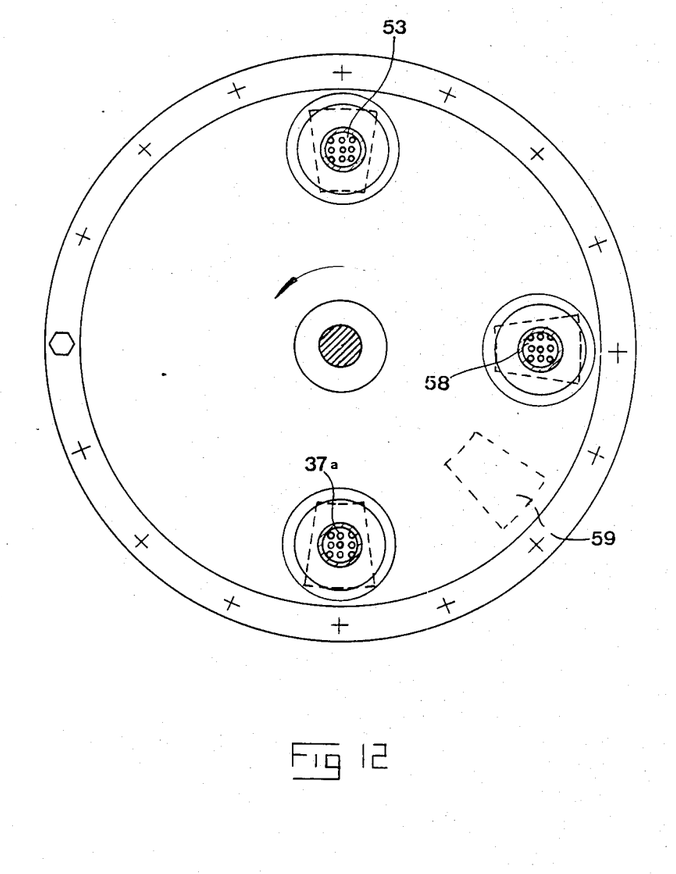
FIG. 12 is a section along line XII—XII in FIG. 11.
Figure 13:
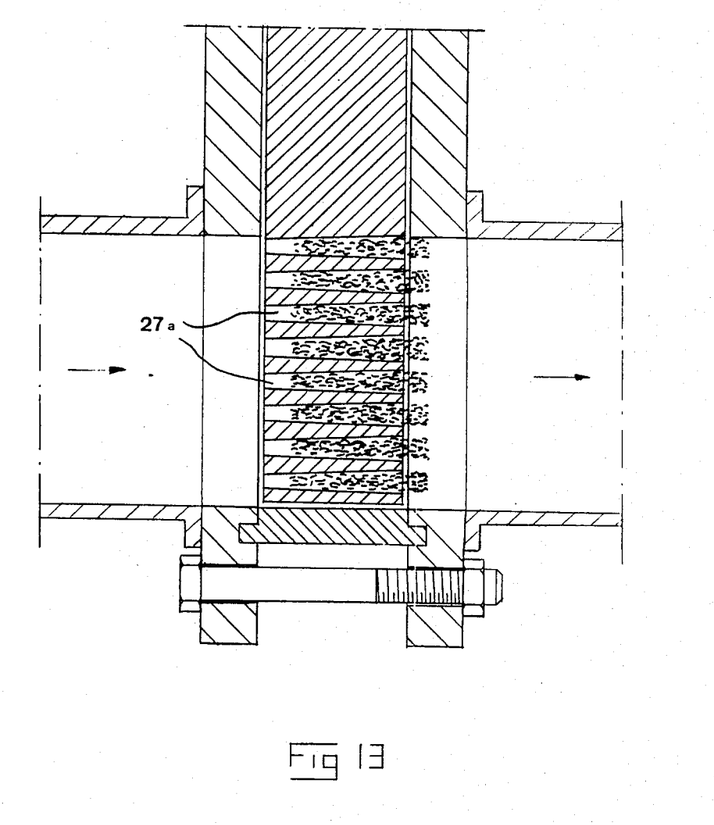
FIG. 13 is an enlarged view of a lower portion in FIG. 1.

The supply member embodiment illustrated in FIGS. 11–13 is particularly adapted for wet food of such consistency that it is pumpable. The supply member 2a is used with liquid perferably water, as transport fluid in conduit 3a. Thus, pump 4 is a water pump. Supply member 2a has a rotor 26a in the form of a cylindrical disk rotatable about a shaft 25a. The rotor is located in a housing 31a formed by side walls 32a and 33a and a mantel 34a. The rotor has cells but these are constructed as axial through holes 27a, FIG. 13 located in a rim along the periphery of the rotor. To fill the holes 27a of the rotor, a food charge arrangement 52 is adapted to forcibly direct a stream of food through an inlet 53 in side wall 33a into holes 27a of the rotor as these pass by the inlet. Arrangement 52 also includes a food outlet 54 arranged in the opposite side wall 32a and communicating with holes 27a on the side of the housing opposite to inlet opening 53 so that outlet 54 may receive excessive food which through inlet 53 is fed into the holes. A pump 55 is adapted to obtain the food flow through inlet 53. Outlet 54 communicates with a food container 56 by return line 57a. Container 56 also communicates with pump 55.

The water flow generated by pump 4 enters via conduit 3a the inlet opening 35a in side wall 32a. In the corresponding side wall 33a, an outlet opening 37a is provided. Openings 35a and 37a are located so that holes 27a pass by the openings. As appears by FIG. 13, the holes 27a have a decreasing section from one side of the rotor to the other. The inlet 53 is located on that side of the rotor where the widest ends of the holes open while the water flow maintained in conduit 3a enters holes 27a through inlet 35a on the side of the rotor where the narrowest ends of the holes open. In this way, filling and evacuating of the holes is simplified.

A by pass line 60 may be arranged to cause a partial flow of water in the conduit 3a upstream the rotor 26a to pass by the rotor and be added to the conduit downstream the rotor.

It is desirable that holes 27a do not contain water when reaching the fill opening 53. In order to obtain such evacuation of the holes, the housing is provided with an inlet opening 58 situated before inlet opening 53 as viewed in the direction of rotation of the rotor. To this inlet 58, a fan (not illustrated) is to be connected to direct a water evacuating air flow into said inlet 58, through the holes of the rotor and out through an outlet opening on the other side of the rotor. Through such evacuation of water from the holes, problems with dilution of the food are eliminated.

As indicated with dashed lines at 59 in FIG. 12, it would be conceivable to provide an inlet opening for washing the holes of the rotor with water after evacuation of the holes by the water flow in conduit 3a but before air is blown through the holes.

In use of the embodiment according to FIGS. 11–13 food is successively pumped into the holes 27a as the rotor is rotated past inlet opening 53. The pumping is to be carried out with such excess that a certain quantity always passes out through outlet 54 to ensure that the holes of the rotor are completely filled. When the food filled holes reach the inlet and outlet openings 35a and 37a they are exposed to the water flow in conduit 3a from pump 4 so that the holes are evacuated of food. The water/food mixture is thereafter distributed in the previously described manner to the various fish bags by the selectors 7.

Modifications are conceivable within the scope of the invention.

We claim:

1. A method for feeding animals, particularly fish, comprising introducing food into a conduit by a movable supply member having a plurality of food cells and transporting said food through said conduit to a feed location in a flow of fluid generated by a pressurized fluid source, wherein an individual charge of food is introduced into each of the respective food cells of said movable supply member as each food cell is successively moved to a fill area, and wherein said individual charges of food are discharged from said respective food cells of said movable supply members by said flow of fluid being directed to flow into and through said food cells as each food cells is successively moved to a discharge area, thereby positively evacuating said food charges from said cells and transferring said food charges into said conduit.

2. The method according to claim 1, wherein food charges transported through said conduit are diverted to different feed locations by path selectors disposed along said conduit.

3. A device for feeding animals, particularly fish, comprising a conduit leading to a feed location, a member for supplying food into said conduit and a pressurized fluid source to provide a flow of fluid through said conduit for transport of said food, said food supply member comprising a rotor having food cells adapted to be successively filled with individual food charges and brought into communication with said conduit for successively discharging said individual charges into said conduit, said rotor being located in a housing having inlet and outlet openings, said inlet opening communicating with a conduit portion located upstream of said housing and said outlet opening communicating with a conduit portion located downstream of said housing, said inlet and outlet openings of said housing being further disposed so as to have between them a portion of said rotor and being adapted to cause said flow of fluid generated by said pressurized fluid source to flow into and through said cells of said rotor from one end of said cells to the other end thereof as said cells are successively rotated proximate to said inlet opening so as to positively evacuate said food charges from said cells and transfer said food charges from said cells into said conduit through the outlet opening.

4. A device according to claim 3, wherein said pressurized fluid source is a pump and wherein a control unit controls the operation of said rotor and said pump such that fluid flow is generated by operation of said pump during periods when said rotor is not in operation.

5. A device according to claim 3, wherein a path selector is located along said conduit, said selector serving to divert food transported in said conduit to various feed locations.

6. A device according to claim 5, wherein each of said path selectors comprises a rotatable diverting member having a tapering passage, said rotatable diverting member being displaceable between two discrete positions, wherein the wider end of said tapered passage communicates with the upstream end of the conduit in each of said two positions of said member and wherein the narrower end of said tapered passage communicates with a feed location in one of said member positions and the downstream end of said conduit in the other of said member positions.

7. A device according to claim 3 further comprising a food charging arrangement, said food charging arrangement being provided with an inlet and an outlet, wherein said food charging arrangement is adapted to forcibly direct a flow of food through said arrangement inlet and into a cell of said rotor as each of said cells is rotated into communication with said arrangement inlet, and wherein said outlet of said food charging arrangement draws off any excessive food forced into a cell before said cell is rotated into communication with said conduit.

8. A device according to claim 7, wherein said cells comprise transverse holes through said rotor, said holes decreasing in cross section from one side of said rotor to the other, said inlet of said food charging arrangement being located on said one side of said rotor, and said fluid flow maintained in said conduit entering said holes from said other side of said rotor.

9. A device according to claim 7, wherein said fluid in said conduit is a liquid and said pressurized fluid source is adapted to evacuate said liquid in said cells of said rotor by directing an air flow through said cells after evacuation of said food therein by said liquid flow in said conduit.

10. A device according to claim 3, wherein said food cells of said rotor are open generally in the axial direction of the rotor and said inlet and outlet openings of said housing are directed generally axially relative to the rotor.

11. A device according to claim 10, wherein said outlet opening of said housing is larger than said inlet opening of said housing and is offset relative thereto, so that each cell approaching said openings enters into communication with said outlet opening before entering into communication with said inlet opening.

12. A device according to claim 10, wherein the volume of said cells is variable by inserts mountable in the cells and open in the axial direction of the rotor.

13. A device according to claim 12, wherein said cells open in the radial direction of the rotor and said fill area and a fill opening is arranged in a mantle of said housing.

14. A device according to claim 13 wherein a knife protrudes from a side of said fill opening, said knife being disposed such that one edge thereof protrudes outwardly above the periphery of the rotor in close proximity thereto.

* * * * *